United States Patent
Linde et al.

(10) Patent No.: US 10,848,745 B2
(45) Date of Patent: *Nov. 24, 2020

(54) HEAD-MOUNTED DISPLAY TRACKING SYSTEM

(71) Applicant: Facebook Technologies, LLC, Menlo Park, CA (US)

(72) Inventors: Oskar Linde, San Carlos, CA (US); Andrew Melim, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,510

(22) Filed: Nov. 1, 2019

(65) Prior Publication Data

US 2020/0068187 A1 Feb. 27, 2020

Related U.S. Application Data

(63) Continuation of application No. 15/728,389, filed on Oct. 9, 2017, now Pat. No. 10,506,217.

(51) Int. Cl.
*H04N 13/25* (2018.01)
*H04N 13/243* (2018.01)
(Continued)

(52) U.S. Cl.
CPC ............ *H04N 13/25* (2018.05); *H04N 5/232* (2013.01); *H04N 5/2353* (2013.01);
(Continued)

(58) Field of Classification Search
CPC .... H04N 13/25; H04N 13/344; H04N 13/296; H04N 13/243; H04N 13/275; H04N 13/366
(Continued)

(56) References Cited

U.S. PATENT DOCUMENTS 8,908,043 B2 12/2014 Tricoukes et al.
2015/0097719 A1 4/2015 Balachandreswaran et al.
(Continued)

FOREIGN PATENT DOCUMENTS

| WO | WO 2016/095057 A1 | 6/2016 | |
| WO | WO-2016095057 A1 * | 6/2016 | ........... G02B 27/017 |
| WO | WO 2017/092804 A1 | 6/2017 | |

OTHER PUBLICATIONS

Extended European Search Report, European Application No. 18189223.3, dated Jan. 7, 2019, 12 pages.
(Continued)

*Primary Examiner* — On S Mung
(74) *Attorney, Agent, or Firm* — Fenwick & West LLP (57) ABSTRACT

A head-mounted display (HMD) is configured to capture images and/or video of a local area. The HMD includes an imaging assembly and a controller. The imaging assembly includes a plurality of cameras positioned at different locations on the HMD and oriented to capture images of different portions of a local area surrounding the HMD. The controller generates imaging instructions for each camera using image information. The imaging instructions cause respective midpoints of exposure times for each camera to occur at a same time value for each of the captured images. The cameras capture images of the local area in accordance with the imaging instructions. The controller determines a location of the HMD in the local area using the captured images and updates a model that represents a mapping function of the depth and exposure settings of the local area.

20 Claims, 7 Drawing Sheets

(51) Int. Cl.
*H04N 13/275* (2018.01)
*H04N 13/296* (2018.01)
*H04N 13/344* (2018.01)
*H04N 13/366* (2018.01)
*H04N 5/235* (2006.01)
*H04N 5/243* (2006.01)
*H04N 5/232* (2006.01)

(52) U.S. Cl.
CPC ........... *H04N 5/2355* (2013.01); *H04N 5/243* (2013.01); *H04N 13/243* (2018.05); *H04N 13/275* (2018.05); *H04N 13/296* (2018.05); *H04N 13/344* (2018.05); *H04N 13/366* (2018.05)

(58) Field of Classification Search
USPC .......................................................... 348/48
See application file for complete search history.

(56) References Cited

U.S. PATENT DOCUMENTS

| 2016/0209655 | A1 | 7/2016 | Riccomini et al. |
| 2016/0210785 | A1 | 7/2016 | Balachandreswaran et al. |
| 2016/0225191 | A1 | 8/2016 | Mullins |
| 2016/0248995 | A1 | 8/2016 | Mullins et al. |
| 2016/0260251 | A1 | 9/2016 | Stafford et al. |
| 2016/0316110 | A1 | 10/2016 | Ross et al. |
| 2017/0134717 | A1 | 5/2017 | Trail et al. |

OTHER PUBLICATIONS

PCT International Search Report and Written Opinion, PCT Application No. PCT/US2017/056183, dated Jun. 21, 2018, 15 pages.

\* cited by examiner

FIG. 6 ated Oct. 9, 2017, which is
HEAD-MOUNTED DISPLAY TRACKING SYSTEM

CROSS REFERENCE TO RELATED APPLICATIONS

This application is a continuation of co-pending U.S. application Ser. No. 15/728,389, filed Oct. 9, 2017, which is incorporated by reference in its entirety.

BACKGROUND

The disclosure relates generally to head-mounted displays, and specifically to a head-mounted display tracking system.

Oftentimes virtual reality (VR) systems include external devices for determining position and movement of a headset worn by a user. Operation for such systems are accordingly constrained to specific regions (e.g., a room) that include the external devices. Moreover, such external devices generally determine position of the user using some sort of active illumination source (e.g., structured light) that increase complexity and power requirements for the system.

SUMMARY

A device (e.g., head-mounted display (HMD)) is configured to capture images and/or video of a local area, at least a portion of which is in stereo. The device includes an imaging assembly and a controller.

The imaging assembly includes a plurality of cameras positioned at different locations on the HMD and oriented to capture images of different portions of a local area surrounding the HMD. The plurality of cameras each having overlapping fields of view with adjacent cameras. Each camera in the plurality of cameras generates exposure settings that is used by the controller to generate imaging instructions for each camera. Each camera captures images of the local area in accordance with the imaging instructions.

The controller is configured to generate imaging instructions for each camera using the corresponding exposure settings. The imaging instructions cause respective midpoints of exposure times for each of the plurality of cameras to occur at a same time value for each of the captured images. The controller provides the imaging instructions to the imaging assembly such that the cameras may capture images of the local area. The controller determines a location of the HMD in the local area using the captured images.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
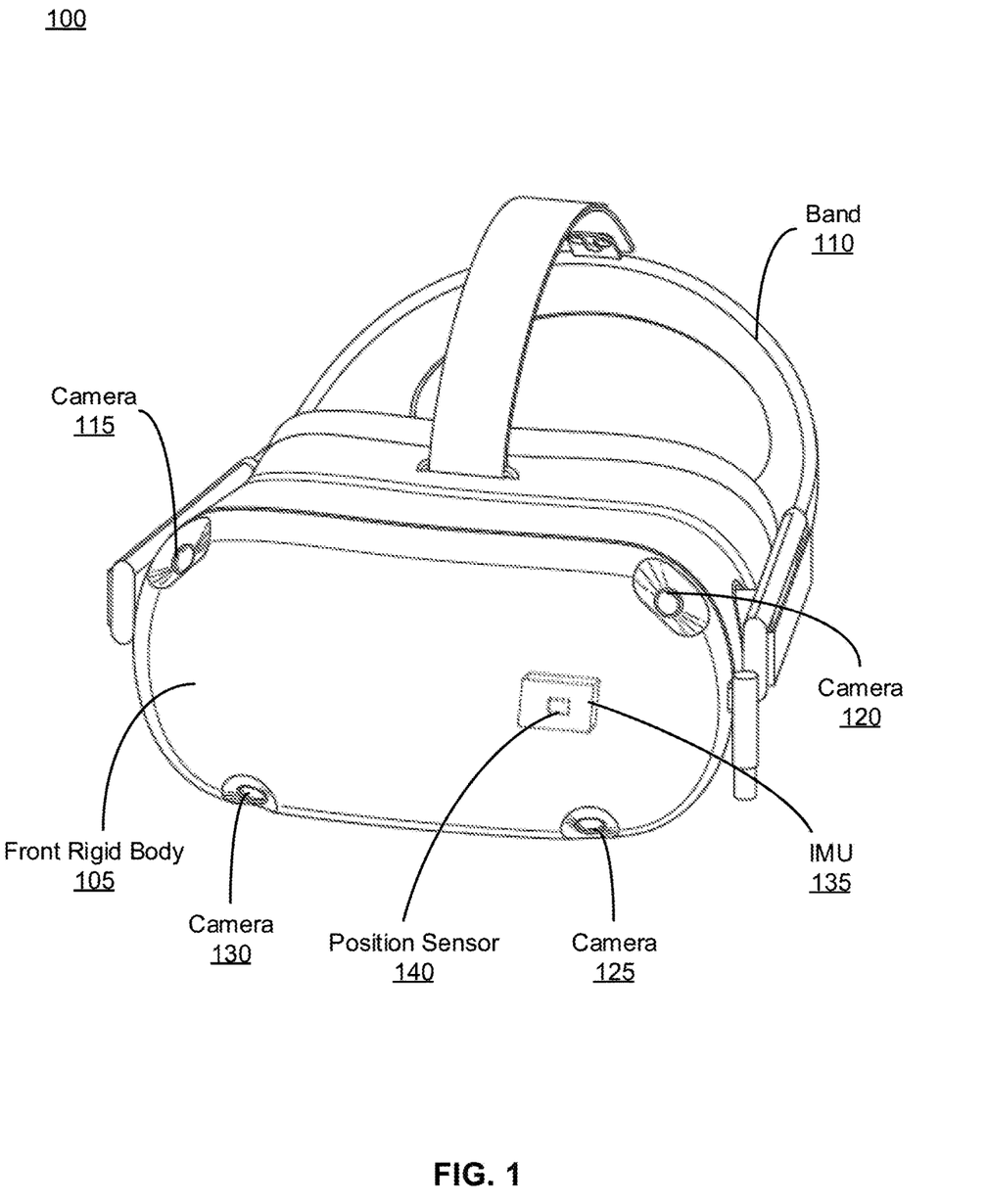
FIG. 1 illustrates a head-mounted display (HMD), according to an embodiment.

FIG. 1 illustrates a head-mounted display (HMD) 100, according to an embodiment. The HMD 100 may be part of, e.g., an artificial reality system. The HMD 100 includes a front rigid body 105, a band 110, and an HMD controller (not shown). In the embodiment of FIG. 1, the HMD 100 includes an imaging assembly, which includes a camera 115, a camera 120, a camera 125, and a camera 130, which are positioned on the front rigid body 105.

The front rigid body 105 includes one or more electronic display elements (not shown in FIG. 1), one or more integrated eye tracking systems (not shown in FIG. 1), an Inertial Measurement Unit (IMU) 135, and one or more position sensors 140. In the embodiment shown by FIG. 1, the position sensors 140 are located within the IMU 135, and neither the IMU 135 nor the position sensors 140 are visible to a user of the HMD 100. The IMU 135 is an electronic device that generates fast calibration data based on measurement signals received from one or more of the position sensors 140. A position sensor 140 generates one or more measurement signals in response to motion of the HMD 100. Examples of position sensors 140 include: one or more accelerometers, one or more gyroscopes, one or more magnetometers, another suitable type of sensor that detects motion, a type of sensor used for error correction of the IMU 135, or some combination thereof. The position sensors 140 may be located external to the IMU 135, internal to the IMU 135, or some combination thereof.

The band 110 secures the HMD 100 to a user's head and positions the front rigid body 105 on a user's face. In the embodiment of FIG. 1, the band 110 secures the HMD 100 to a user's head by wrapping around the back of the user's head. The band 110 may be composed of a durable fabric, such as nylon, polyester, propylene, some other similar material, or some combination thereof. In some embodiments, the band 110 may have elasticity (e.g., elastic nylon) that allows the band 110 to stretch or conform to a user's head. The band 110 may have a variety of configurations that may provide additional comfort or stability for the user wearing the HMD 100. In some embodiments, a cooling fan and/or a power source may be attached along the band 110.

The imaging assembly generates image information using images and/or audio information captured from a local area surrounding the HMD 100. The local area is the environment that surrounds the HMD 100. For example, the local area may be a room that the user wearing the HMD 100 is inside, or the user may be outside and the local area is an outside area that is visible to the HMD 100. The image assembly comprises the cameras 115, 120, 125, 130 positioned to capture a portion of the local area. Image information may include, e.g., one or more images, audio information (e.g., sounds captured by one or more microphones), video information, metadata, or some combination thereof. Image information may include depth information of one or more objects in the local area and/or amount of light detected by the cameras 115, 120, 125, 130. In the embodiment of FIG. 1, the imaging assembly includes the cameras 115, 120, 125, 130.

The cameras 115, 120, 125, 130 are configured to capture images and/or video of different portions of the local area. Each camera 115, 120, 125, 130 includes a sensor (not shown), a lens, and a camera controller (not shown). The sensor is an electrical device that captures light using an array of photo-sensitive pixels (e.g., complementary metal oxide, charged coupled display, etc.), wherein each pixel converts light into an electronic signal. Sensors can have varying features, such as resolution, pixel size and sensitivity, light sensitivity, type of shutter, and type of signal processing. The lens is one or more optical elements of a camera that facilitate focusing light on to the sensor. Lenses have features that can be fixed or variable (e.g., a focus and an aperture), may have varying focal lengths, and may be covered with an optical coating. In some embodiments, one or more of the cameras 115, 120, 125, 130 may have a microphone to capture audio information. The microphone can be located within the camera or may located external to the camera.

Each camera 115, 120, 125, 130 has a field of view that represents a region within the local area viewable by the camera. In the embodiment of FIG. 1, the field of view of each camera 115, 120, 125, 130 can range between 50-180 degrees. A field of view ranging from ~50 to 120 degrees is generally referred to as a wide field of view, and a field of view larger than 120 degrees is generally referred to as a fish eye field of view. In the embodiment of FIG. 1, the lens of each camera 115, 120, 125, 130 may have a same or different degree of field of view. For example, the cameras 115, 120, 125, 130 may have a field of view ranging between 120 to 180 degrees. In the embodiment of FIG. 1, each of the cameras 115, 120, 125, 130 has a 150 degree field of view. Having a 150 degree field of view rather than, e.g., a 180 degree field of view allows each camera to sit flush with the surface of the front rigid body 105 or inset into the front rigid body 105, which may help protect the cameras 115, 120, 125, 130 from damage. Various fields of views may provide different types of coverage between the cameras 115, 120, 125, 130 (e.g., monocular regions, overlapping regions, stereoscopic regions, etc.).

In addition to the field of view of each camera, the position and orientation of each camera 115, 120, 125, 130 allows the type of coverage between the cameras to be controlled. The desired type of coverage may be based on the type of desired information to be gathered from the captured images. In the embodiment of FIG. 1, the cameras 115, 120 are positioned at the upper corners of the front rigid body 105 and are oriented to point outwards and upwards towards the sides and top of the front rigid body 105. In this configuration, cameras 115, 120 have separate fields of view, providing monocular regions of coverage. The cameras 125, 130 are positioned along the bottom edge of the front rigid body 105 and are oriented to point downwards and parallel (or nearly parallel) to each other. In this configuration, cameras 125, 130 have overlapping fields of view, providing stereoscopic regions of coverage. The cameras 115, 120, 125, 130 may have overlapping regions of coverage between the fields of view of the cameras, which allows details from each field of view to be handed over such that frames from the cameras 115, 120, 125, 130 may be stitched together. The configuration of cameras 115, 120, 125, 130 is discussed in greater detail with regards to FIG. 4. In other embodiments, the field of view, position, and orientation of the cameras 115, 120, 125, 130 may vary to provide different types of coverage.

The camera controller of each camera 115, 120, 125, 130 determines exposure settings for the camera. The exposure settings of a camera determines how light captured by the camera is collected by the sensor. Each camera 115, 120, 125, 130 detects the amount of light incident on the sensor, and based on the detected light, the camera controller determines appropriate exposure settings. The exposure settings may include, e.g., aperture size, shutter speed, gain, or some combination thereof. The aperture size controls the amount of light that reaches the sensor. The shutter speed is the length of time that the sensor is exposed to light (i.e., an exposure length). The gain is the sensitivity of the sensor to the light. In the embodiment of FIG. 1, the aperture is a fixed size while the gain and exposure are variable. Using the amount of detected light, the camera controller for each camera determines the aperture size, shutter speed, and gain settings for each camera.

In the embodiment of FIG. 1, each camera controller acts independently such that each controller may determine different exposure settings for the corresponding camera 115, 120, 125, 130 relative to the other cameras. For example, the shutter speed for each camera may vary to expose the sensor to more or less light. This configuration enables a first camera to have a much longer exposure than a second camera, which allows the imaging assembly to capture a varying range of light within a local area and to expose different parts of the local area to gather desired information from the local area. As an example, a local area of a room may have a first side of the room that is well-lit (e.g., a window that allows a large amount of light into the room) while a second side of the room is shrouded in shadows. An imaging assembly having a global exposure setting may determine exposure settings that are appropriate for the first side or the second side of the room but may cause the imaging assembly to over-expose or under-expose the other side of the room, thereby preventing the imaging assembly from capturing images having the desired information of the entire local area. By having cameras 115, 120, 125, 130 with different exposure settings that are determined appropriately for the region of the local area viewed by the respective camera, the imaging assembly captures objects within the local area that are desired. In some embodiments, the HMD 100 may include a single camera controller that is capable of determining separate exposure settings for each camera 115, 120, 125, 130.

In addition, each camera controller may be configured to selectively expose certain portions of the local area within a field of view of its respective camera 115, 120, 125, 130. The camera controller identifies different portions of the room as high priority or low priority and selectively exposes the different portions of the room according to its priority. A high priority area of the local area may be determined as a portion of the local area within proximity to the HMD 100 (e.g., within 10 feet of the HMD), and the remainder of the local area may be a low priority area. In some embodiments, a priority of a portion of the local area may be determined by a defined shift between light levels within the local area. Continuing with the room with a window example, a camera may include the first side of the room and the window in its field of view and detects different levels of light within the room versus outside of the window. Based on the level of light detected, the camera controller identifies the portions of the room as high priority or low priority. For example, the camera controllers may identify the objects within the room as a high priority area and the objects outside of the window as a low priority area to gather desired information from the high priority area rather than the low priority area. The camera controller may associate a first exposure value with the high priority area and a different exposure value with the low priority area. An exposure value represents a combination of a camera's shutter speed and f-number (i.e., the ratio of focal length to aperture size), such that all combinations that yield the same exposure have the same exposure value. The camera controller determines exposure settings for the camera for the high priority area such that the exposure settings expose for the first exposure value. One or more of the cameras 115, 120, 125, 130 may have exposure settings based on exposure values.

The controller of the HMD 100 generates imaging instructions for each camera 115, 120, 125, 130 based on the exposure settings received from each camera. The imaging instructions may include the exposure settings for each camera 115, 120, 125, 130 (e.g., exposure length, gain, aperture, etc.). In addition, the imaging instructions may include synchronization information for each camera 115, 120, 125, 130. The HMD controller generates synchronization information that synchronizes the exposure settings of the cameras 115, 120, 125, 130 such that each camera maintains its individual exposure settings allows the cameras 115, 120, 125, 130. This configuration allows the cameras 115, 120, 125, 130 to capture images of the same frame and ensure that each captured image includes information-rich objects within the local area. In the embodiment of FIG. 1, the synchronization information includes a center time point determined by the HMD controller and a time delay for each camera 115, 120, 125, 130.

The HMD controller synchronizes the exposure settings of each camera 115, 120, 125, 130 by centering the exposure length of each camera 115, 120, 125, 130 about the center time point. In other words, a midpoint of each exposure length is aligned at the same time point. This configuration accommodates the varying exposure lengths of the cameras 115, 120, 125, 130 and ensures that the same frame is captured by each camera. To center the exposures about the same time point, the HMD controller 100 calculates a time delay for each camera 115, 120, 125, 130 that allows each camera to begin image capture after a certain period of time relative to a reference time point. The HMD controller 100 determines an appropriate time delay for each camera 115, 120, 125, 130 according to the exposure length of the camera. In the embodiment of FIG. 1, the reference point for the time delay may be a synchronization pulse that is detected by the HMD 100. The synchronization pulse may be sent by an external device, such as a controller held by the user or a console of the HMD system. The HMD controller sends the imaging instructions, which may include the exposure settings and the synchronization information, to the imaging assembly for image capture. The synchronization of the exposure settings of the cameras 115, 120, 125, 130 is discussed in further detail with regards to FIG. 5. In some embodiments, the functions of the camera controllers may be consolidated and performed by the HMD controller.

The HMD controller is configured to determine depth information for one or more objects in the local area based on one or more captured images from the imaging assembly. Depth information may be determined by measuring the distance to an object using received information about the object's position. In the embodiment of FIG. 1, the HMD controller determines the depth information of objects using the stereoscopic regions of coverage from the cameras 115, 120, 125, 130. The objects within the overlapping regions of fields of view are viewed by more than one camera, which provides more than one perspective of each object. By calculating the relative difference of an object's position between the different perspectives, the HMD controller determines the distance of the object to the imaging assembly. In some embodiments, depth information may be determined by measuring the distance to an object by sending signals (e.g., structured light, radio signals, ultra-sound, etc.) to the object.

The HMD controller is additionally configured to update a local area model for the HMD 100. The local area model includes depth information, exposure settings, or some combination thereof of the environment surrounding the HMD 100. In the embodiment of FIG. 1, the local area model represents a mapping function of depth information and exposure settings of the environment of the HMD 100 based on the location of the HMD 100 within the environment. The location of the HMD 100 within the environment is determined from the depth information gathered from the captured images of the imaging assembly. The local area model provides the exposure settings for each camera 115, 120, 125, 130 for different positions of the cameras within the environment and allows the exposure settings to be adjusted as the location and orientation of the HMD 100 changes within the environment. Using the local area model and position information from the IMU 135 (e.g., velocity vector, acceleration vector, etc.), the HMD controller predicts a future location and orientation of the HMD 100. Subsequently, using the local area model, the HMD controller determines the appropriate exposure settings for the predicted future location and orientation of the HMD 100. Based on the predicted location and orientation and the determined exposure settings, the HMD controller then generates imaging instructions for each camera 115, 120, 125, 130. The imaging instructions specify at which time and at which exposure settings each camera 115, 120, 125, 130 captures images. In this configuration, the HMD 100 does not have to continually get information from each camera 115, 120, 125, 130 to determine each camera's exposure settings and the location of the HMD 100. As the location and orientation of the HMD 100 change within the environment, the HMD controller may update the local area model using depth information and exposure settings from the imaging assembly. In some embodiments, the HMD controller may update a depth model and a separate exposure model. Additionally, functionality described in conjunction with one or more of the components shown in FIG. 1 may be distributed among the components in a different manner than described in conjunction with FIG. 1 in some embodiments. For example, functions performed by the HMD controller may be performed by the camera controllers, or vice versa.

Figure 2A:
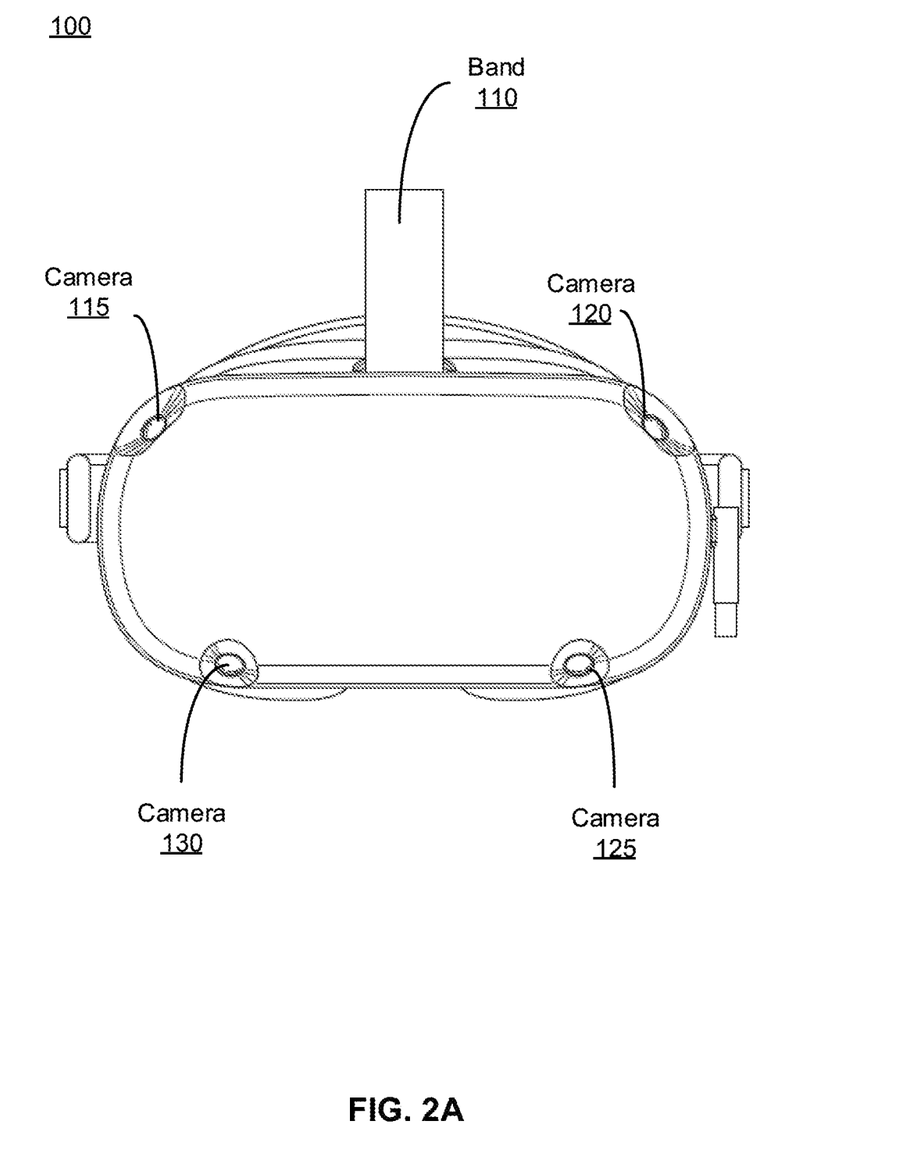
FIG. 2A illustrates a front view of the HMD, according to one embodiment.

FIG. 2A illustrates a front view of the HMD 100, according to one embodiment. As illustrated in FIG. 2A, HMD 100 includes the cameras 115, 120, 125, 130 located along an edge of the front surface of the HMD 100. Each camera 115, 120, 125, 130 is nested within a respective pocket, which may help prevent damage to the camera. As previously described, the cameras 115, 120 are positioned at the upper corners of the front rigid body 105 and point outwards and upwards towards the sides and top of the front rigid body 105, while the cameras 125, 130 are positioned along the bottom edge of the front rigid body 105 and are oriented to point downwards and parallel (or nearly parallel) to each other. In this configuration, the cameras 115, 120, 125, 130 capture images of a large portion of the local environment surrounding the HMD 100. In other embodiments, the number, position, and orientation of the cameras may vary to provide different types of coverage.

Figure 2B:
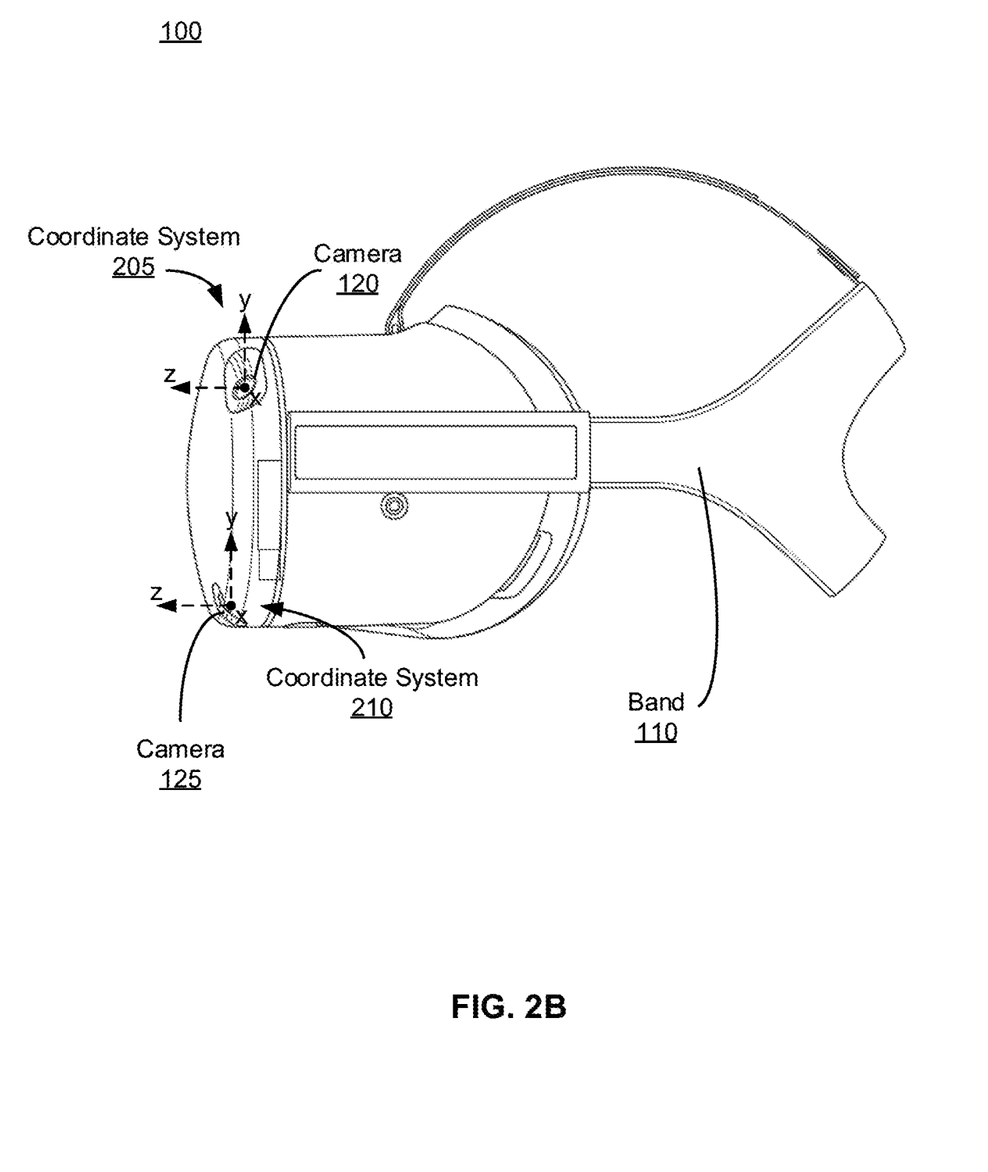
FIG. 2B illustrates a side view of the HMD, according to one embodiment.

FIG. 2B illustrates a side view of the HMD 100, according to one embodiment. As illustrated in FIG. 2B, the band 110 is attached to a side of the HMD 100 and is configured to wrap around a user's head to secure the HMD 100 in front of a user's face. In some embodiments, the HMD 100 may include a strap configured to be placed over the top of the user's head to further stabilize the position of the HMD 100 while worn by a user. In addition, FIG. 2B illustrates the orientations of the cameras 120, 125 relative to respective coordinate systems 205, 210. As shown in FIG. 2B, the cameras 120, 125 are positioned such that their respective fields of views are not only overlapping but cover a large area of the local area.

Figure 3:
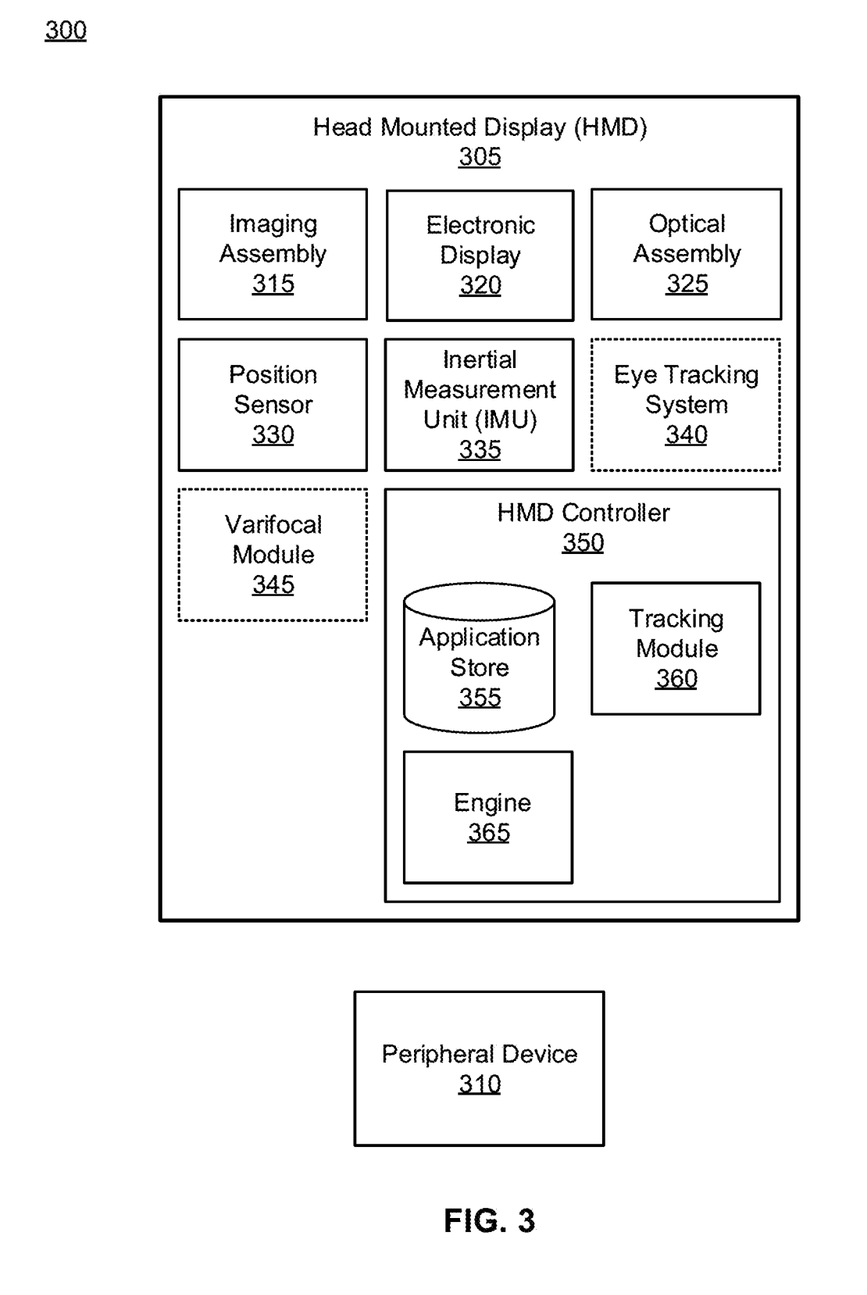
FIG. 3 is a block diagram illustrating an embodiment of an HMD system, according to one embodiment.

FIG. 3 is a block diagram illustrating an embodiment of an HMD system 300, according to one embodiment. The HMD system 300 may operate in an artificial reality system environment. The HMD system 300 shown by FIG. 3 comprises an HMD 305 that is associated with a peripheral device 310. While FIG. 3 shows an example HMD system 300 including one HMD 305, in other embodiments any number of these components may be included in the HMD system 300. For example, there may be multiple HMDs 305 each communicating with respective peripheral devices 310. In alternative configurations, different and/or additional components may be included in the HMD system 300. Additionally, functionality described in conjunction with one or more of the components shown in FIG. 3 may be distributed among the components in a different manner than described in conjunction with FIG. 3 in some embodiments.

The HMD 305 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 305 and presents audio data based on the audio information. The HMD 305 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 305 is the HMD 100 described above in conjunction with FIG. 1.

The peripheral device 310 is a device that a user uses to send action requests to the HMD 305 and receive responses from the HMD 305. An action request is a request to perform a particular action. For example, an action request may be an instruction to start or end capture of image or video data or an instruction to perform a particular action within an application. The peripheral device 310 may include one or more input devices. Example input devices include: a mouse, a game controller, or any other suitable device for receiving action requests and communicating the action requests to the HMD controller 350. An action request received by the peripheral device 310 is communicated to the HMD controller 350, which performs an action corresponding to the action request. In some embodiments, the peripheral device 310 includes an IMU that captures calibration data indicating an estimated position of the peripheral device 310 relative to an initial position of the peripheral device 310. In some embodiments, the peripheral device 310 may provide haptic feedback to the user in accordance with instructions received from the HMD controller 350. For example, haptic feedback is provided when an action request is received, or the HMD controller 350 communicates instructions to the peripheral device 310 causing the peripheral device 310 to generate haptic feedback when the HMD controller 350 performs an action.

In some embodiments, the peripheral device 310 facilitates the process of synchronizing the exposure settings of the imaging assembly of the HMD 305. As described with regards to FIG. 1, the imaging assembly may include a plurality of cameras, e.g., the cameras 115, 120, 125, 130, that each have individual exposure settings. The exposure settings of each camera are synchronized by the HMD controller to capture images centered about a same time point. The peripheral device 310 is configured to send a synchronization pulse to the HMD 305 that serves as a reference time point from which the time delay for each camera is measured. In the embodiment of FIG. 3, the synchronization pulse may be one or more flashes that are detected by the imaging assembly, e.g., imaging assembly 315. The flash may be in the visible light range (e.g., 400-700 nanometers, infrared (e.g., 700-1,000,000 nanometers), any other light detectable by the imaging assembly 315, or some combination thereof. The flash may be emitted by a light-emitting diode (LED). In some embodiments, the peripheral device 310 sends the synchronization pulse to the HMD 305 before each image capture by the imaging assembly 315. The peripheral device 310 may include a microcontroller having its own time base that allows the peripheral device 310 to send a synchronization pulse to the HMD 305 at an appropriate time. In some embodiments, the synchronization pulse is sent at a specified time interval. Alternatively, the peripheral device 310 may receive instructions from the HMD 305 that specify a synchronization protocol. The synchronization protocol synchronizes the HMD 305 and the peripheral device 310 on the same time base. In alternate embodiments, the peripheral device 310 sends an initial synchronization pulse to the HMD 305, and once the exposures of the cameras are synchronized, the imaging assembly captures images at specified time intervals.

In some embodiments, the peripheral device 310 is tracked by the imaging assembly 315 of the HMD 305. The peripheral device 310 may be configured to emit a tracking pulse that may be detected by the imaging assembly 315. The tracking pulse may be a flash in the visible light range, infrared, or any other light detectable by the imaging assembly 315. The tracking pulse is distinguishable from the synchronization pulse. The tracking pulse allows the motion of the peripheral device 310 to be tracked as it moves within the field of view of the imaging assembly 315.

The HMD 305 includes an imaging assembly 315, an electronic display 320, an optical assembly 325, one or more position sensors 330, an IMU 335, an optional eye tracking system 340, an optional varifocal module 345, and an HMD controller 350. Some embodiments of the HMD 305 have different components than those described in conjunction with FIG. 3. Additionally, the functionality provided by various components described in conjunction with FIG. 3 may be differently distributed among the components of the HMD 305 in other embodiments.

The imaging assembly 315 captures data describing depth information of a local area surrounding some or all of the HMD 305. The imaging assembly 315 includes one or more cameras located on the HMD 305 that capture images and/or video information and/or audio information. In some embodiments, the imaging assembly 315 can compute the depth information using the data (e.g., based on captured images having stereoscopic views of objects within the local area). In addition, the imaging assembly 315 determines the amount of light detected by each camera in the imaging assembly 315. The imaging assembly 315 may send the depth information and amount of light detected to the HMD controller 350 for further processing. The imaging assembly 315 is an embodiment of the imaging assembly in FIG. 1.

The electronic display 320 displays 2D or 3D images to the user in accordance with data received from the imaging assembly controller. In various embodiments, the electronic display 320 comprises a single electronic display or multiple electronic displays (e.g., a display for each eye of a user). Examples of the electronic display 320 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 325 magnifies image light received from the electronic display 320, corrects optical errors associated with the image light, and presents the corrected image light to a user of the HMD 305. The optical assembly 325 includes a plurality of optical elements. Example optical elements included in the optical assembly 325 include: an aperture, a Fresnel lens, a convex lens, a concave lens, a filter, a reflecting surface, or any other suitable optical element that affects image light. Moreover, the optical assembly 325 may include combinations of different optical elements. In some embodiments, one or more of the optical elements in the optical assembly 325 may have one or more coatings, such as partially reflective or anti-reflective coatings.

Magnification and focusing of the image light by the optical assembly 325 allows the electronic display 320 to be physically smaller, weigh less and consume less power than larger displays. Additionally, magnification may increase the field of view of the content presented by the electronic display 320. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 325 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 320 for display is pre-distorted, and the optical assembly 325 corrects the distortion when it receives image light from the electronic display 320 generated based on the content.

The IMU 335 is an electronic device that generates data indicating a position of the HMD 305 based on measurement signals received from one or more of the position sensors 330 and from depth information received from the imaging assembly 315. A position sensor 330 generates one or more measurement signals in response to motion of the HMD 305. Examples of position sensors 330 include: one or more accelerometers, one or more gyroscopes, one or more magnetometers, another suitable type of sensor that detects motion, a type of sensor used for error correction of the IMU 335, or some combination thereof. The position sensors 330 may be located external to the IMU 335, internal to the IMU 335, or some combination thereof.

Based on the one or more measurement signals from one or more position sensors 330, the IMU 335 generates data indicating an estimated current position of the HMD 305 relative to an initial position of the HMD 305. For example, the position sensors 330 include multiple accelerometers to measure translational motion (forward/back, up/down, left/right) and multiple gyroscopes to measure rotational motion (e.g., pitch, yaw, roll). In some embodiments, the IMU 335 rapidly samples the measurement signals and calculates the estimated current position of the HMD 305 from the sampled data. For example, the IMU 335 integrates the measurement signals received from the accelerometers over time to estimate a velocity vector and integrates the velocity vector over time to determine an estimated current position of a reference point on the HMD 305. The reference point is a point that may be used to describe the position of the HMD 305. The reference point may generally be defined as a point in space or a position related to the HMD's 305 orientation and position.

The IMU 335 receives one or more parameters from the HMD controller 350. The one or more parameters are used to maintain tracking of the HMD 305. Based on a received parameter, the IMU 335 may adjust one or more IMU parameters (e.g., sample rate). In some embodiments, certain parameters cause the IMU 335 to update an initial position of the reference point so it corresponds to a next position of the reference point. Updating the initial position of the reference point as the next calibrated position of the reference point helps reduce accumulated error associated with the current position estimated the IMU 335. The accumulated error, also referred to as drift error, causes the estimated position of the reference point to "drift" away from the actual position of the reference point over time. In some embodiments of the HMD 305, the IMU 335 may be a dedicated hardware component. In other embodiments, the IMU 335 may be a software component implemented in one or more processors.

In some embodiments, the eye tracking system 340 is integrated into the HMD 305. The eye tracking system 340 determines eye tracking information associated with an eye of a user wearing the HMD 305. The eye tracking information determined by the eye tracking system 340 may comprise information about an orientation of the user's eye, i.e., information about an angle of an eye-gaze. In some embodiments, the eye tracking system 340 is integrated into the optical assembly 325. An embodiment of the eye-tracking system 340 may comprise an illumination source and an imaging device (camera).

In some embodiments, the varifocal module 345 is further integrated into the HMD 305. The varifocal module 345 may be coupled to the eye tracking system 340 to obtain eye tracking information determined by the eye tracking system 340. The varifocal module 345 may be configured to adjust focus of one or more images displayed on the electronic display 320, based on the determined eye tracking information obtained from the eye tracking system 340. In this way, the varifocal module 345 can mitigate vergence-accommodation conflict in relation to image light. The varifocal module 345 can be interfaced (e.g., either mechanically or electrically) with at least one of the electronic display 320 and at least one optical element of the optical assembly 325. Then, the varifocal module 345 may be configured to adjust focus of the one or more images displayed on the electronic display 320 by adjusting position of at least one of the electronic display 320 and the at least one optical element of the optical assembly 325, based on the determined eye tracking information obtained from the eye tracking system 340. By adjusting the position, the varifocal module 345 varies focus of image light output from the electronic display 320 towards the user's eye. The varifocal module 345 may be also configured to adjust resolution of the images displayed on the electronic display 320 by performing foveated rendering of the displayed images, based at least in part on the determined eye tracking information obtained from the eye tracking system 340. In this case, the varifocal module 345 provides appropriate image signals to the electronic display 320. The varifocal module 345 provides image signals with a maximum pixel density for the electronic display 320 only in a foveal region of the user's eye-gaze, while providing image signals with lower pixel densities in other regions of the electronic display 320. In one embodiment, the varifocal module 345 may utilize the depth information obtained by the imaging assembly 315 to, e.g., generate content for presentation on the electronic display 320.

The HMD controller 350 processes content for the HMD 305 based on information received from the imaging assembly 315. In the example shown in FIG. 3, the HMD controller 350 includes an application store 355, a tracking module 360, and an engine 365. Some embodiments of the HMD controller 350 have different modules or components than those described in conjunction with FIG. 3. Similarly, the functions further described below may be distributed among components of the HMD controller 350 in a different manner than described in conjunction with FIG. 3.

The application store 355 stores one or more applications for execution by the HMD controller 350. An application is a group of instructions, that when executed by a processor, generates content for presentation to the user. Content generated by an application may be in response to inputs received from the user via movement of the HMD 305 or the peripheral device 310. Examples of applications include: gaming applications, conferencing applications, video playback applications, or other suitable applications.

The tracking module 360 calibrates the HMD system 300 using one or more calibration parameters and may adjust one or more calibration parameters to reduce error in determination of the position of the HMD 305 or of the peripheral device 310. For example, the tracking module 360 communicates a calibration parameter to the imaging assembly 315 to adjust the focus of the imaging assembly 315 to more accurately determine positions of objects captured by the imaging assembly 315. Calibration performed by the tracking module 360 also accounts for information received from the IMU 335 in the HMD 305 and/or an IMU 335 included in the peripheral device 310. Additionally, if tracking of the peripheral device 310 is lost (e.g., the imaging assembly 315 loses line of sight of at least a portion of the peripheral device 310), the tracking module 360 may re-calibrate some or all of the HMD system 300.

The tracking module 360 tracks movements of the HMD 305 or of the peripheral device 310 using information from the imaging assembly 315, the one or more position sensors 330, the IMU 335 or some combination thereof. For example, the tracking module 345 determines a position of a reference point of the HMD 305 in a mapping of a local area based on information from the imaging assembly 315. The tracking module 360 may also determine positions of the reference point of the HMD 305 or a reference point of the peripheral device 310 using data indicating a position of the HMD 305 from the IMU 335 or using data indicating a position of the peripheral device 310 from an IMU 335 included in the peripheral device 310, respectively. Additionally, in some embodiments, the tracking module 360 may use portions of data indicating a position or the HMD 305 from the IMU 335 as well as representations of the local area from the imaging assembly 315 to predict a future location of the HMD 305. The tracking module 360 provides the estimated or predicted future position of the HMD 305 or the peripheral device 310 to the engine 355.

The engine 365 processes information (e.g., depth and/or exposure) received from the imaging assembly 315. Using the received information, the engine 365 synchronizes the exposure settings for the cameras of the imaging assembly 315. As described with regards to FIG. 1, the exposure settings of each camera in the imaging assembly 315 are aligned about the center time point such that images captured by the imaging assembly 315 are information-rich and of the same frame. To center the exposure lengths of the cameras in the imaging assembly 315, the engine 365 determines the midpoint of the exposure length of each camera and aligns the midpoints about the center time point. Additionally, the engine 365 determines an appropriate time delay for the image capture of each camera in the imaging assembly 315 according to the exposure length of the camera. Based on the determined exposure settings and synchronization information, the engine 365 generates imaging instructions to send to the imaging assembly 315 and/or the peripheral device 310. In the embodiment of FIG. 3, the engine 365 has its own time base by which it determines the center time point and calculates a corresponding time delay for each camera. The HMD controller 350 may communicate with the peripheral device 310 to synchronize the units of the engine 365 and the microcontroller of the peripheral device 310 on the same time base. Syncing the units allows the peripheral device 310 to send the synchronization pulse in accordance with imaging instructions of the HMD 305.

The engine 365 also updates a local area model using the information from the imaging assembly 315 and the tracking module 360. The local area model may represent a mapping function of the area surrounding some or all of the HMD 305 (i.e., the "local area") based on the location of the HMD 305 within the local area. The local area model provides the exposure settings for each camera of the imaging assembly 315 for different positions and orientations of the HMD 305 and allows the exposure settings to be adjusted as the location and orientation of the HMD 305 changes within the environment. The engine 365 may calculate depth of objects within the environment using one or more techniques in computing depth from the stereoscopic images captured by the imaging assembly 315. From the mapped objects, the HMD controller determines a location of the HMD 305 within the environment and updates the local area model of the environment. The tracking module 360 may also update the local area model with position information of the HMD 305 as the HMD 305 changes location and orientation within the environment. The engine 365 uses the local area model to determine the appropriate exposure settings for each camera in the imaging assembly 315 based on the new location and orientation of the HMD 305. Once the appropriate exposure settings are determined for each camera in the imaging assembly 315, the engine 365 synchronizes the exposure settings and generates imaging instructions for the imaging assembly 315. In addition, the engine 365 updates the local area model with the new location and orientation of the HMD 305. In some embodiments, the engine 365 generates the local area model using the depth information and amount of light detected by the imaging assembly 315 from a first frame or a first set of frames to map the objects within the environment surrounding the HMD 305. In other embodiments, a local area model is pre-loaded or downloaded by the engine 365.

The engine 365 may additionally use information from the tracking module 360 in conjunction with the local area model. Using information from the tracking module 360, the engine 365 can predict a future location and orientation of the HMD 305. Subsequently using the local area model, the engine 365 determines the appropriate exposure settings for each camera in the imaging assembly 315 for the predicted future location and orientation of the HMD 305. The local area model allows the engine 365 to efficiently adjust exposure settings of the cameras in the imaging assembly 315 such that the engine 365 does not have to analyze the depth information and amount of light detected by the imaging assembly 315 at each new location and/or orientation of the HMD 305. As the location and orientation of the HMD 305 changes within the environment, the engine 365 may update the local area model using depth information and amount of light detected from the imaging assembly 315. Additionally, the imaging assembly 315 may be configured to send depth information and amount of light detected by the engine 365 at certain time intervals to account for any changes in the level of light that may have occurred within the environment and to ensure that the local area model is updated accordingly.

The engine 365 also executes applications within the HMD system 300 and receives position information, acceleration information, velocity information, predicted future positions, or some combination thereof, of the HMD 305 from the tracking module 360. Based on the received information, the engine 365 determines content to provide to the electronic display 320 for presentation to the user. For example, if the received information indicates that the user has looked to the left, the engine 365 generates content for the electronic display 320 that mirrors the user's movement in a virtual environment or in an environment augmenting the local area with additional content. Additionally, the engine 365 performs an action within an application executing on the HMD controller 350 in response to an action request received from the peripheral device 310 and provides feedback to the user that the action was performed. The provided feedback may be visual or audible feedback via the HMD 305 or haptic feedback via the peripheral device 310.

In some embodiments, based on the eye tracking information (e.g., orientation of the user's eye) received from the eye tracking system 340, the engine 365 determines resolution of the content provided to the electronic display 320 for presentation to the user. The engine 365 provides the content having a maximum pixel resolution on the electronic display 320 in a foveal region of the user's gaze, whereas the engine 365 provides a lower pixel resolution in other regions of the electronic display 320, thus achieving less power consumption at the HMD 305 and saving computing cycles of the HMD controller 350 without compromising a visual experience of the user. In some embodiments, the engine 365 can further use the eye tracking information to adjust where objects are displayed on the electronic display 320 to prevent vergence-accommodation conflict.

Figure 4:
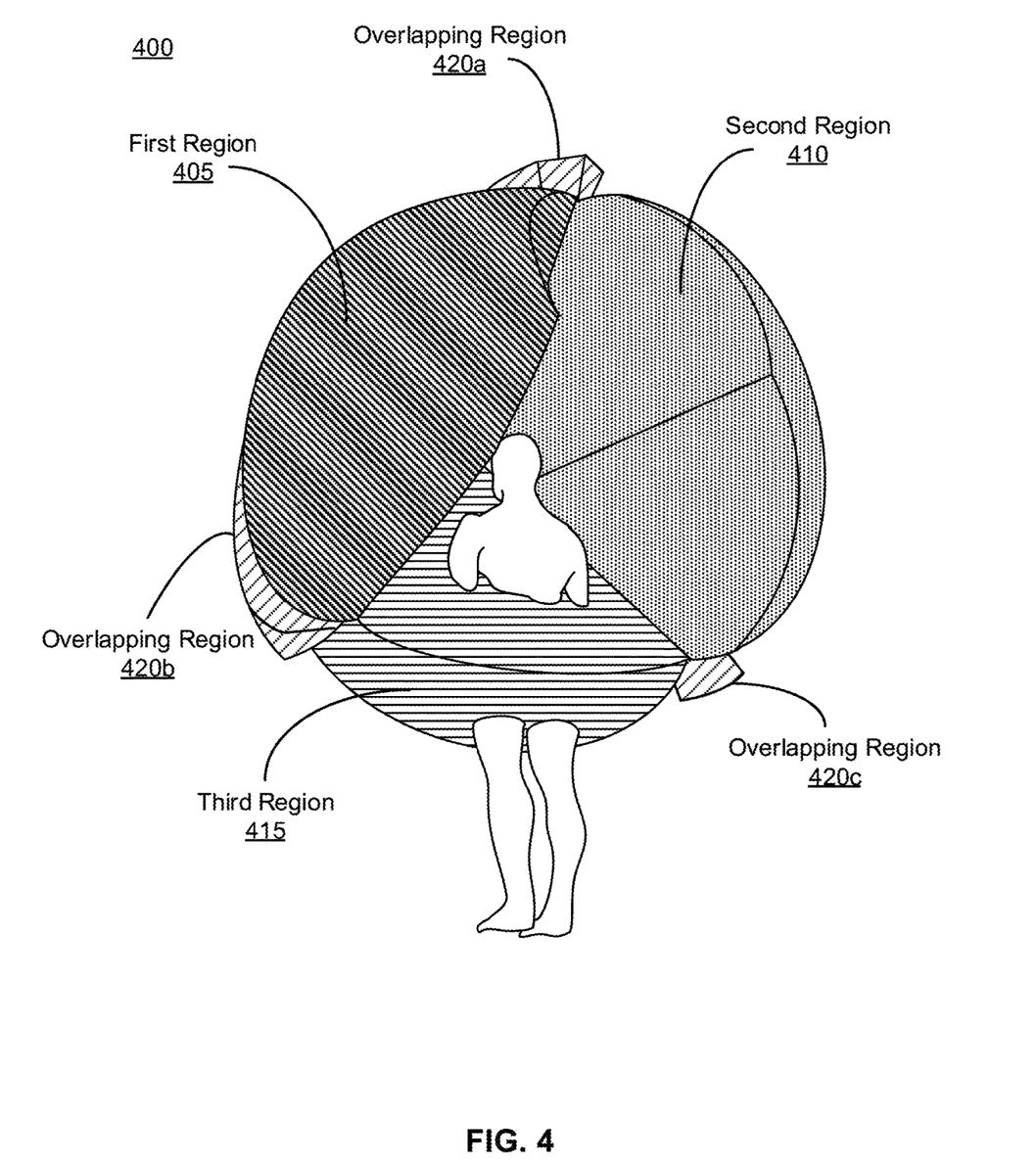
FIG. 4 illustrates a field of view for a plurality of cameras on an HMD, according to one embodiment.

FIG. 4 illustrates a tracking region 400 of HMD 100, according to one embodiment. The tracking region 400 is a portion of the local area surrounding the HMD 100 that is viewable by the imaging assembly on the HMD 100. Objects within the tracking region 400 are detected by the cameras 115, 120, 125, 130, which capture image information of the objects. As illustrated in FIG. 4, the tracking region 400 is composed of several smaller regions, each region corresponding to a type of coverage provided by the fields of view of the cameras 115, 120, 125, 130 on the HMD 100. In the embodiment of FIG. 4, the tracking volume 400 comprises a first region 405, a second region 410, a third region 415, and three overlapping regions 420.

The first region 405 represents a monocular region of coverage. In the embodiment of FIG. 4, the first region 405 is provided by the field of view of camera 120. As described with regards to FIG. 1, the camera 120 is positioned at the upper left corner of the front rigid body 105 of the HMD 100 and is oriented to point outwards and upwards towards the sides and top of the front rigid body 105, and the camera 120 has a field of view ranging between 120 to 180 degrees. Thus, the first region 405 includes objects of the local area located in the user's upper left field of view. For a user wearing the HMD 100, objects of interest are likely to be located at or below eye level of the user. As a result, determining depth information for objects in the upper left corner of the user's field of view may not be as desirable. As a result, a single camera provides a sufficient perspective for the objects in the first region 405 of the local area. In some embodiments, it may be desirable to have a different type of coverage in this region. For example, the HMD 100 may be in an outdoor environment wherein objects of interest (e.g., kites, airplanes, etc.) are located above the user's eye level. The position and orientation of the cameras on the HMD 100 may be adjusted to better suit the environment of the HMD 100.

The second region 410 represents a monocular region of coverage. In the embodiment of FIG. 4, the second region 410 is provided by the field of view of camera 115. As described with regards to FIG. 1, the camera 115 is positioned at the upper right corner of the front rigid body 105 of the HMD 100 and is oriented to point outwards and upwards towards the sides and top of the front rigid body 105, and the camera 115 has a field of view ranging between 120 to 180 degrees. Thus, the second region 410 includes objects of the local area located in the user's upper right field of view. Similar to the first region 405, determining depth information for objects in the upper right corner of the user's field of view may not be as desirable since objects of interest are likely to be located at or below eye level of the user. As a result, a single camera provides a sufficient perspective for the objects in the second region 410 of the local area. In some embodiments, it may be desirable to have a different type of coverage in this region. The position and orientation of the cameras on the HMD 100 may be adjusted to better suit the environment of the HMD 100.

The third region 415 represents a stereoscopic region of coverage. In the embodiment of FIG. 4, the third region 415 is provided by the fields of view of cameras 125, 130. As described with regards to FIG. 1, the cameras 125, 130 are positioned along the bottom edge of the front rigid body 105 and are oriented to point downwards and parallel (or nearly parallel) to each other, and the cameras 125, 130 have a field of view ranging between 120 to 180 degrees. The cameras 125, 130 have substantially the same orientation such that the fields of view of the camera 125 and the camera 130 entirely (or nearly entirely) overlap, providing stereoscopic coverage for the objects within the third region 415. The third region 415 includes objects of the local area located at or below eye level of the user. As previously mentioned, the objects within this region may be of higher interest to the user. As a result, stereoscopic coverage of this region is desirable as multiple perspectives allow the HMD 100 to determine sufficient depth information for the objects within the third region 415.

In some embodiments, the user may hold a peripheral device, e.g., peripheral device 310, in his or her hands. As described with regards to FIG. 3, a user uses the peripheral device to send and receive requests from the HMD. Additionally, the peripheral device facilitates the process of synchronizing the exposure settings of the imaging assembly by sending a synchronization pulse that is detected by the imaging assembly. As such, the peripheral device is an object of high interest, and it is desirable to capture sufficient image information of the peripheral device. Typically, a user holds the peripheral device in a neutral position, which is characterized by the user's arms hanging at his or her sides. In the embodiment of FIG. 4, the cameras 125, 130 are positioned to tilt downwards to view a majority of the user's body, such that the peripheral device likely falls within the third region 415 even if the user is moving his or her head. Stereoscopic coverage of the third region 415 helps mitigate partial occlusion of the peripheral device as the HMD 100 has two different vantage points to view the peripheral device. The camera configuration for the third region 415 also improves the accuracy of tracking the peripheral device if the user moves his or her hands and improves the depth information captured for other objects within the third region 415.

The overlapping regions 420 each represent a stereoscopic region of coverage. In the embodiment of FIG. 4, the overlapping regions 420 are provided by overlapping fields of view between adjacent cameras (e.g., cameras 115 and 120, cameras 115 and 130, and cameras 120 and 125). The overlapping regions 420 between adjacent cameras allow details from a first field of view to be handed over to a second field of view such that frames from different cameras may be stitched together. Objects that fall within an overlapping region 420 may also be used to calibrate the cameras of the HMD 100 and additionally correct for issues that may arise from thermal expansion of HMD components during use.

Figure 5:
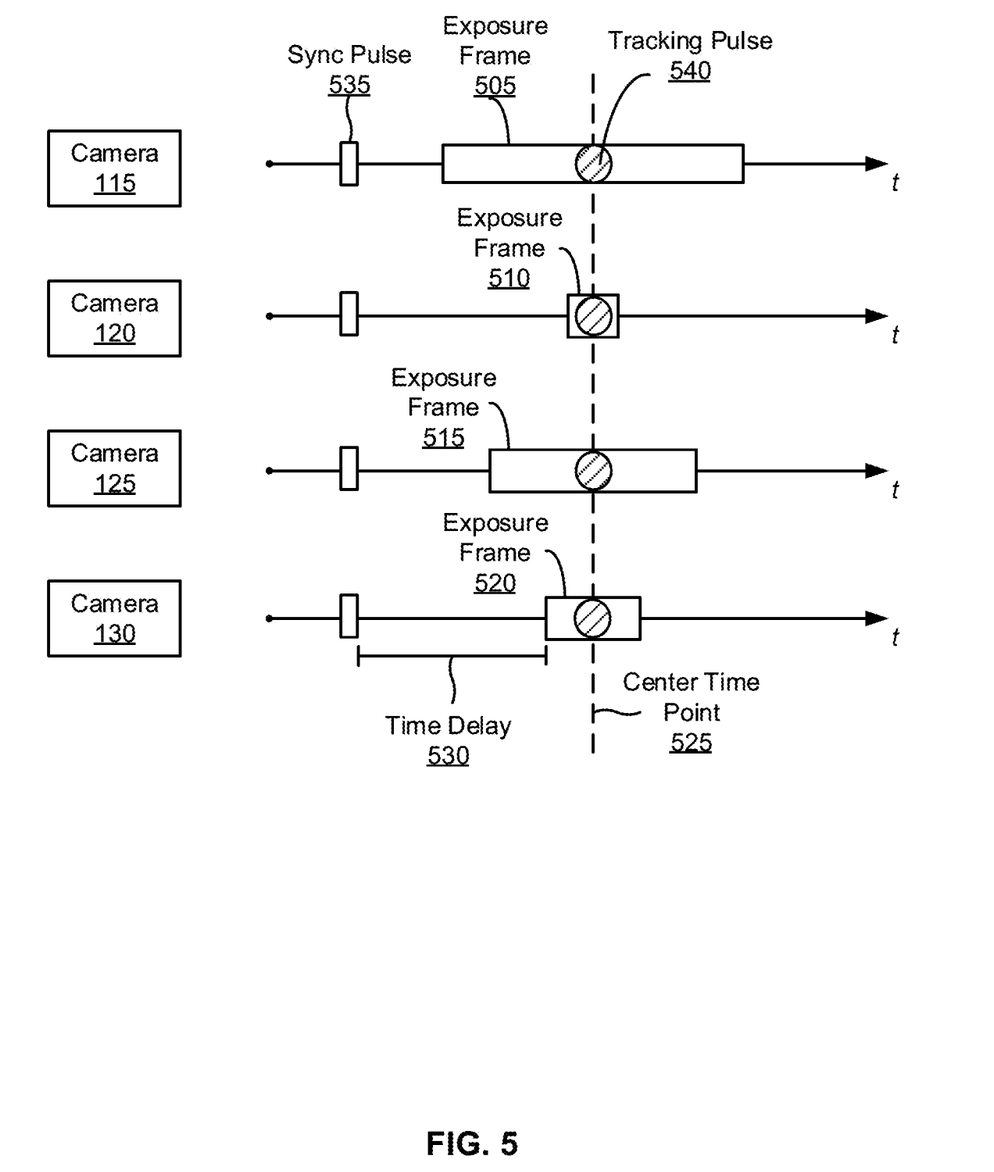
FIG. 5 illustrates a method for synchronizing image capture of the plurality of cameras on the HMD, according to one embodiment.

FIG. 5 illustrates a method for synchronizing image capture of the cameras 115, 120, 125, 130 on the HMD 100, according to one embodiment. As described with regards to FIG. 1, the cameras 115, 120, 125, 130 are configured to have individual exposure settings rather than a global exposure setting applied to the imaging assembly. This configuration enables a first camera to have a much longer exposure than a second camera, allowing the imaging assembly to capture a varying range of light within a local area surrounding the HMD 100. The HMD 100 selects different parts of the local area to drive exposure towards to gather desired information from the local area. As illustrated in FIG. 5, each camera 115, 120, 125, 130 has a different length of exposure frame 505, 510, 515, 520, respectively. To synchronize the image capture of the cameras 115, 120, 125, 130, an HMD controller (e.g., the HMD controller 350) determines a center time point 525 of the exposure frames 505, 510, 515, 520 and a corresponding time delay 530 for each camera 115, 120, 125, 130. The time delay 530 is measured relative to a synchronization ("sync") pulse 535 detected by one or more of the cameras 115, 120, 125, 130.

The center time point 525 is a time point about which each exposure frame 505, 510, 515, 520 is centered. The HMD controller evaluates the length of each exposure frame 505, 510, 515, 520 and determines the midpoint of each exposure frame. The HMD controller then aligns the midpoint of each exposure frame at the center time point 525. This configuration ensures that the cameras 115, 120, 125, 130 capture the same frame while maintaining individual exposure settings.

The time delay 530 is a specified amount of time that passes between a reference time point and the beginning of an exposure frame for a camera. Programming each camera 115, 120, 125, 130 with a respective time delay 530 ensures that each camera 115, 120, 125, 130 begins image capture at an appropriate time such that the respective exposure frames 505, 510, 515, 520 are centered about the center time point 525. As each exposure frame 505, 510, 515, 520 may have different lengths, the time delay for each camera 115, 120, 125, 130 varies accordingly. For example, since exposure frame 505 of camera 115 is longer than exposure frame 510 of camera 120, camera 115 has a shorter time delay than camera 120. Thus, camera 115 begins image capture before camera 120 such that the midpoints of the exposure frames 505, 510 align along the center time point 525. In the embodiment of FIG. 5, the time delay 530 is measured relative to the synchronization ("sync") pulse 535 as the reference time point.

The sync pulse 535 triggers the beginning of the time delay 530 for each camera 115, 120, 125, 130. The sync pulse 535 may be a signal emitted by an external device, such as a peripheral device or a console of the system, that is detected by one or more cameras of the imaging assembly. In some embodiments, the sync pulse 535 may be one or more simultaneous flashes in the visible light range, infrared, or any other light range detectable by the cameras 115, 120, 125, 130. In some embodiments, the sync pulse 535 may be detected by each camera 115, 120, 125, 130, as illustrated in FIG. 5. In some embodiments, the sync pulse 535 may be detected by at least one camera such that the HMD controller may subsequently relay the event information to each camera 115, 120, 125, 130, thereby triggering the beginning of the time delay 530 for each camera 115, 120, 125, 130. In the embodiment of FIG. 5, once the HMD controller determines the center time point 525 and an appropriate time delay 530 for each camera 115, 120, 125, 130 based on the respective exposure frames 505, 510, 515, 520, the HMD controller sends the imaging instructions to each camera. This configuration accommodates the varying exposure lengths of the cameras 115, 120, 125, 130 and ensures that the same frame is captured by each camera. As the HMD 100 changes location and orientation within the environment of the HMD 100, the exposure settings of each camera may be adjusted, and thus, the synchronization information is adjusted accordingly.

In some embodiments, the HMD 100 tracks the position and movement of a peripheral device held by a user. As described with regards to FIG. 1, the peripheral device is a device that allows a user to send action requests to the HMD 100 and receive response from the HMD 100. In the embodiment of FIG. 5, the peripheral device is configured to emit a tracking pulse 540 that may be detected by one or more of the cameras 115, 120, 125, 130. The tracking pulse 540 may be one or more flashes in the visible light range, infrared, or any other light detectable by the cameras 115, 120, 125, 130. Since the cameras 115, 120, 125, 130 each have different exposure lengths, the peripheral device emits the tracking pulse 540 at a specific time such that the tracking pulse 540 may be detected during the exposure frame of each camera 115, 120, 125, 130. In the embodiment of FIG. 5, the peripheral device emits the tracking pulse 540 at the center time point 525. The peripheral device may have a microcontroller having a time base synced with the HMD 100, enabling the peripheral device to emit the tracking pulse 540 at an accurate time point.

Figure 6:
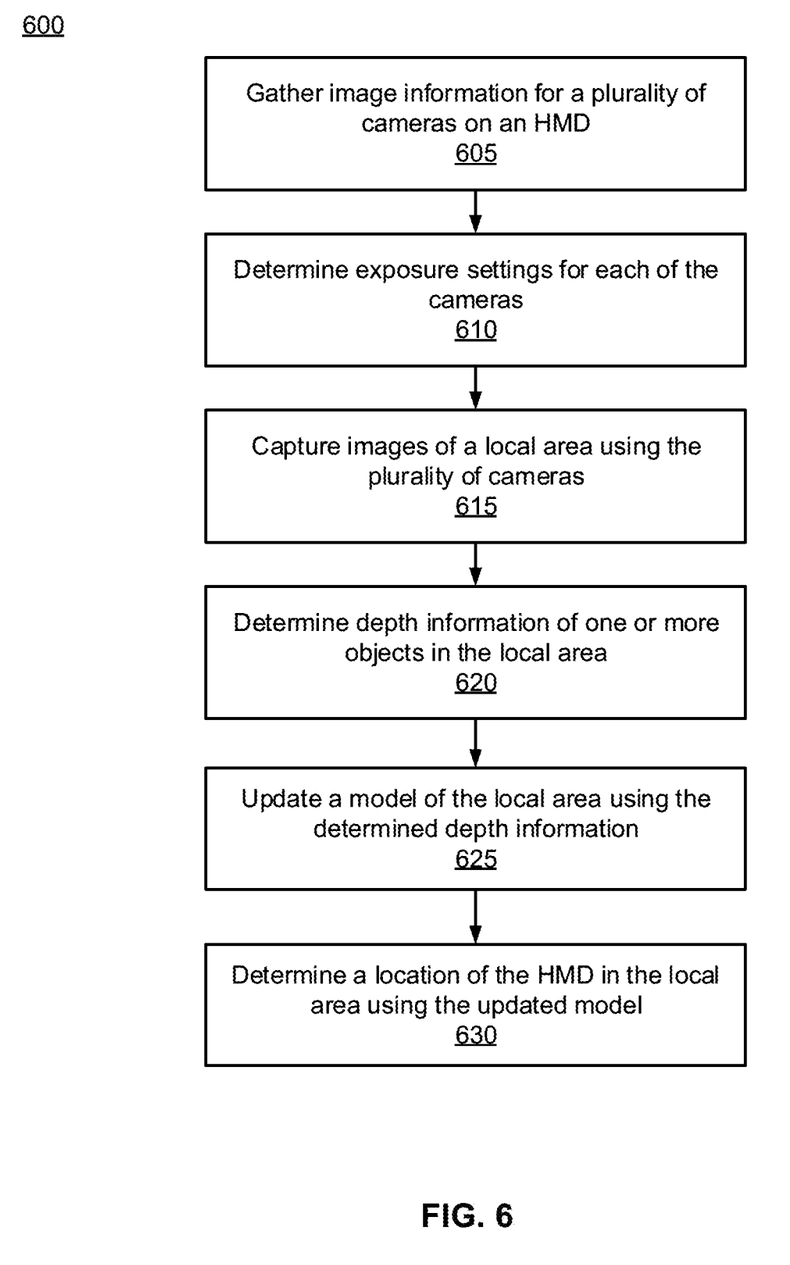
FIG. 6 is a flowchart illustrating a process of determining a location of an HMD within a local area, according to one embodiment.

FIG. 6 is a flowchart illustrating a process 600 of determining a location of an HMD within a local area, which may be implemented at the HMD 100 shown in FIG. 1, according to one embodiment. The process 600 of FIG. 6 may be performed by the components of the HMD 100 (e.g., imaging assembly 315, HMD controller 350, tracking module 360, engine 365), the peripheral device 310, or some combination thereof. Other entities (e.g., a console of the HMD system) may perform some or all of the steps of the process in other embodiments. Likewise, embodiments may include different and/or additional steps or perform the steps in different orders.

The HMD 100 gathers 605 image information (e.g., via an imaging assembly) for a plurality of cameras on the HMD 100. The image information may include depth information of one or more objects in the local area and/or the amount of light incident on the sensor of the camera. In some embodiments, the image information is gathered from the local area model based on the location of the HMD 100 within the local area. In some embodiments, the image information is gathered from the imaging assembly.

For each camera in the imaging assembly, the HMD 100 determines 610 exposure settings using the image information. The exposure settings may include, e.g., aperture size, shutter speed, gain, or some combination thereof. In some embodiments, each camera on the HMD 100 is configured to have individual exposure settings, which allows the imaging assembly to capture a varying range of light within the local area and to expose different parts of the local area to gather desired information. In these embodiments, the HMD 100 generates synchronization information for each camera to synchronize the exposure settings of the cameras, which ensures that the same frame is captured by each camera. The synchronization information includes a center time point about which the exposure length of each camera is centered and a time delay for each camera that is measured relative a synchronization pulse. As described with regards to FIG. 1, the synchronization pulse may be sent to the HMD 100 from an external device (e.g., a peripheral device or a console of the system). Based on the exposure settings and synchronization information, the HMD 100 generates imaging instructions for each camera.

The HMD 100 captures 615 images of a local area using the plurality of cameras. The images are captured 615 in accordance with the imaging instructions generated by the HMD 100. In some embodiments, the HMD 100 may capture video and/or audio information as well. The captured images include one or more objects of the local area. As described with regards to FIGS. 1 and 4, the position and orientation of the cameras of the imaging assembly allow the cameras to capture information of different portions of the local area. For example, cameras 115, 120 on HMD 100 capture the upper right and left portions of the local area in the user's field of view while cameras 125, 130 capture the portions of the local area at a user's eye level and below. The imaging instructions cause the cameras of the imaging assembly to capture images that provide information of different portions of the local area that are of the same frame.

The HMD 100 determines 620 depth information of one or more objects in the local area. Depth information is determined from the images captured by the HMD 100. As described with regards to FIGS. 1 and 4, the position and orientation of the cameras determine the type of coverage provided by the cameras on the HMD 100. The HMD 100 includes cameras having overlapping regions of the fields of view of the cameras. The objects within these overlapping regions are viewed by more than one camera, which provides more than one perspective of each object. By calculating the relative difference of an object's position between the different perspectives, the HMD 100 determines the distance of the object to the imaging assembly.

The HMD 100 updates 625 a local area model of the local area using the determined depth information. As described with regards to FIG. 3, in some embodiments, the HMD 100 generates a local area model that represents a mapping function of the environment of the HMD 100 based on the location of the HMD 100 within the environment. In other embodiments, the local area model is pre-loaded or downloaded onto the HMD 100.

The HMD 100 determines 630 its location within the local area using the updated model. In some embodiments, the local area model additionally includes exposure settings for the cameras on the HMD 100. In these embodiments, the local area model provides exposure settings for each camera based on the location and orientation of the HMD 100 within the environment such that the HMD 100 determines appropriate exposure settings for the determined location of the HMD 100. This configuration allows the exposure settings to be adjusted as the location and orientation of the HMD 100 changes within the environment. In some embodiments, the HMD 100 additionally predicts a future location of the HMD 100 based on information from the tracking module and using the local area model. In the embodiments in which the local area model includes exposure information, the HMD 100 determines appropriate exposure settings for the predicted future location of the HMD 100.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   configuring a plurality of cameras on a device within a local area with exposure settings from a model, the model mapping locations within the local area to corresponding exposure settings;
   capturing image information associated with the local area using the plurality of cameras that are configured with the exposure settings; and
   determining a location of the device within the local area using the captured image information.

2. The method of claim 1, further comprising:
   determining a midpoint of an exposure length of each of the plurality of cameras;
   centering the determined midpoint for each camera about a same time point; and
   determining a time delay for each of the plurality of camera, wherein the time delay is a period of time between a reference time point and a beginning of the exposure length of the camera, causing each camera to begin image capture such that the midpoint of the exposure length of each camera occurs at the same time point.

3. The method of claim 2, wherein the reference time point is controlled by a synchronization pulse emitted from a peripheral device that is separate from the device.

4. The method of claim 1, further comprising:
   generating measurement signals using an inertial measurement unit (IMU) in response to motion of the device.

5. The method of claim 4, further comprising:
   predicting a future location of the device within the local area using information from the IMU and the model.

6. The method of claim 5, further comprising:
   determining exposure settings for a camera of the plurality of cameras based on the predicted future location.

7. A non-transitory computer-readable storage medium storing instructions that, when executed by one or more processors of a device, cause the one or more processors to perform operations comprising:
   configuring a plurality of cameras on the device within a local area with exposure settings from a model, the model mapping locations within the local area to corresponding exposure settings;
   capturing image information associated with the local area using the plurality of cameras that are configured with the exposure settings; and
   determining a location of the device within the local area using the captured image information.

8. The computer-readable storage medium of claim 7, wherein the operations further comprise:
   determining a midpoint of an exposure length of each of the plurality of cameras;
   centering the determined midpoint for each camera about a same time point; and
   determining a time delay for each camera, wherein the time delay is a period of time between a reference time point and a beginning of the exposure length of the camera, causing each camera to begin image capture such that the midpoint of the exposure length of each camera occurs at the same time point.

9. The computer-readable storage medium of claim 8, wherein the reference time point is controlled by a synchronization pulse emitted from a second device that is separate from the device.

10. The computer-readable storage medium of claim 7, wherein the operations further comprise:
    generating measurement signals using an inertial measurement unit (IMU) in response to motion of the device.

11. The computer-readable storage medium of claim 10, wherein the operations further comprise:
    predicting a future location of the device within the local area using information from the IMU and the model.

12. The computer-readable storage medium of claim 11, wherein the operations further comprise:
    determining exposure settings for a camera of the plurality of cameras based on the predicted future location.

13. A device comprising:
    an imaging assembly that includes a plurality of cameras positioned at different locations on the device and oriented to capture images of different portions of a local area surrounding the device;
    a controller configured to:
       configuring the plurality of cameras on the device with exposure settings from a model, the model mapping locations within the local area to corresponding exposure settings;

capturing image information associated with the local area using the plurality of cameras that are configured with the exposure settings; and determining a location of the device within the local area using the captured image information.

14. The device of claim 13, wherein the imaging assembly comprises at least two cameras, each camera having a field of view within a range of 120 to 180 degrees.

15. The device of claim 14, wherein a first camera and a second camera have a substantially parallel orientation such that the fields of view of the first camera and the second camera provide stereoscopic imaging of a portion of the local area.

16. The device of claim 15, wherein a third camera and a fourth camera have a different orientation such that only a portion of the fields of view of the third camera and the fourth camera overlap.

17. The device of claim 13, wherein the controller is configured to provide a programmed time delay for each of the plurality of cameras, the time delay a period of time between a reference time point and the beginning of an exposure for the camera, and the reference time point is controlled by a synchronization pulse detected by the device.

18. The device of claim 17, wherein the synchronization pulse is a pulse of light emitted by a peripheral device.

19. The device of claim 13, wherein the exposure settings for each of the plurality of cameras changes as a location of the device within the local area changes, and wherein the controller generates updated imaging instructions based on the changed exposure settings.

20. The device of claim 13, wherein the controller is further configured to:
   determine a midpoint of an exposure length of each of the plurality of cameras;
   center the determined midpoint for each camera about a same time point; and
   determine a time delay for each camera, wherein the time delay is a period of time between a reference time point and a beginning of the exposure length of the camera, causing each camera to begin image capture such that the midpoint of the exposure length of each camera occurs at the same time point.

* * * * *